United States Patent
Tabet et al.

(10) Patent No.: US 7,821,400 B2
(45) Date of Patent: Oct. 26, 2010

(54) SYSTEM AND METHOD FOR VERIFYING NUMBER OF WIRELESS TAGGED ITEMS IN A TRANSACTION

(75) Inventors: Nicolas N. Tabet, Eugene, OR (US); Craig D. Cherry, Eugene, OR (US); Charles F. Atwater, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 311 days.

(21) Appl. No.: 11/861,276

(22) Filed: Sep. 25, 2007

(65) Prior Publication Data

US 2008/0079584 A1 Apr. 3, 2008

Related U.S. Application Data

(60) Provisional application No. 60/848,143, filed on Sep. 29, 2006.

(51) Int. Cl.
*G08B 13/14* (2006.01)
(52) U.S. Cl. .................................... 340/572.4; 235/385
(58) Field of Classification Search ............. 340/572.4, 340/572.1, 10.1; 235/385
See application file for complete search history.

(56) References Cited

U.S. PATENT DOCUMENTS

| | | | |
|---|---|---|---|
| 4,613,990 A | 9/1986 | Halpern | |
| 4,680,583 A | 7/1987 | Grover | |
| 5,113,349 A | 5/1992 | Nakamura et al. | |
| 5,343,025 A | 8/1994 | Usui | |
| 5,530,702 A | 6/1996 | Palmer | |
| 5,579,306 A | 11/1996 | Dent | |
| 5,581,707 A | 12/1996 | Kuecken | |
| 5,590,409 A | 12/1996 | Sawahashi et al. | |
| 5,640,002 A | 6/1997 | Ruppert et al. | |
| 5,659,167 A | 8/1997 | Wang et al. | |
| 5,665,956 A | 9/1997 | La et al. | |
| 5,732,077 A | 3/1998 | Whitehead | |
| 5,835,025 A | 11/1998 | Zufelt et al. | |
| 5,943,610 A | 8/1999 | Endo | |
| 5,945,660 A | 8/1999 | Nakasuji et al. | |
| 5,986,560 A | 11/1999 | Rayburn | |
| 5,995,019 A | 11/1999 | Chieu et al. | |
| 6,046,683 A | 4/2000 | Pidwerbetsky et al. | |
| 6,072,784 A | 6/2000 | Agrawal et al. | |

(Continued)

FOREIGN PATENT DOCUMENTS

WO    WO 03/032501    4/2003

OTHER PUBLICATIONS

U.S. Appl. No. 11/364,851, filed Feb. 27, 2006.

(Continued)

*Primary Examiner*—John A Tweel, Jr.
(74) *Attorney, Agent, or Firm*—Stoel Rives LLP

(57) ABSTRACT

A system and method for reading multiple items bearing electronic tags, such as radio frequency identification (RFID) tags, disposed in a read zone wherein a correlation scheme/system, separate (e.g. non-RF) from the electronic reader, is provided for verifying that all the items in the read zone have been successfully read. Typically, the user/operator is then notified whether or not all the items detected by the verification system have been successfully read by the electronic reader.

13 Claims, 4 Drawing Sheets

U.S. PATENT DOCUMENTS

| | | | |
|---|---|---|---|
| 6,104,512 | A | 8/2000 | Batey, Jr. et al. |
| 6,115,695 | A | 9/2000 | Kern |
| 6,118,988 | A | 9/2000 | Choi |
| 6,122,329 | A | 9/2000 | Zai et al. |
| 6,150,948 | A | 11/2000 | Watkins |
| 6,170,748 | B1 | 1/2001 | Hash et al. |
| 6,265,962 | B1 | 7/2001 | Black et al. |
| 6,305,607 | B1 | 10/2001 | Katz et al. |
| 6,318,636 | B1 | 11/2001 | Reynolds et al. |
| 6,332,098 | B2 | 12/2001 | Ross et al. |
| 6,354,493 | B1 | 3/2002 | Mon |
| 6,377,203 | B1 | 4/2002 | Doany |
| 6,407,665 | B2 | 6/2002 | Maloney |
| 6,415,978 | B1 | 7/2002 | McAllister |
| 6,429,775 | B1 | 8/2002 | Martinez et al. |
| 6,445,297 | B1 | 9/2002 | Nicholson |
| 6,456,239 | B1 | 9/2002 | Werb et al. |
| 6,577,238 | B1 | 6/2003 | Whitesmith et al. |
| 6,600,418 | B2 | 7/2003 | Francis et al. |
| 6,607,134 | B1 | 8/2003 | Bard et al. |
| 6,669,089 | B2 | 12/2003 | Cybulski et al. |
| 6,687,460 | B2 | 2/2004 | Muller |
| 6,707,376 | B1 | 3/2004 | Patterson et al. |
| 6,707,381 | B1 | 3/2004 | Maloney |
| 6,724,308 | B2 | 4/2004 | Nicholson |
| 6,745,027 | B2 | 6/2004 | Twitchell, Jr. |
| 6,758,303 | B2 | 7/2004 | Keys et al. |
| 6,758,403 | B1 | 7/2004 | Keys et al. |
| 6,816,063 | B2 | 11/2004 | Kubler et al. |
| 6,917,292 | B2 | 7/2005 | Watanabe et al. |
| 6,970,518 | B2 | 11/2005 | Kuffner et al. |
| 7,030,761 | B2 | 4/2006 | Bridgelall et al. |
| 7,042,358 | B2 | 5/2006 | Moore |
| 7,063,256 | B2 | 6/2006 | Anderson et al. |
| 7,117,374 | B2 | 10/2006 | Hill et al. |
| 7,195,169 | B2 | 3/2007 | Bhatia et al. |
| 7,199,716 | B2 | 4/2007 | Shanks et al. |
| 7,215,976 | B2 | 5/2007 | Brideglall |
| 7,221,668 | B2 | 5/2007 | Twitchell, Jr. |
| 7,243,849 | B2 | 7/2007 | Lapstun et al. |
| 7,515,051 | B2 | 4/2009 | Wagner |
| 2001/0008390 | A1 | 7/2001 | Berquist et al. |
| 2001/0041948 | A1 | 11/2001 | Ross et al. |
| 2002/0072395 | A1 | 6/2002 | Miramontes |
| 2003/0015585 | A1 | 1/2003 | Wike et al. |
| 2004/0022227 | A1 | 2/2004 | Lynch et al. |
| 2004/0073933 | A1 | 4/2004 | Gollnick et al. |
| 2004/0118916 | A1 | 6/2004 | He |
| 2004/0252025 | A1 | 12/2004 | Silverbrook et al. |
| 2005/0004702 | A1 | 1/2005 | McDonald |
| 2005/0212676 | A1 | 9/2005 | Steinberg |
| 2005/0223286 | A1 | 10/2005 | Forster |
| 2005/0285742 | A1 | 12/2005 | Charych et al. |
| 2005/0289020 | A1 | 12/2005 | Burns et al. |
| 2006/0012465 | A1 | 1/2006 | Lee et al. |
| 2006/0036346 | A1 | 2/2006 | Andersen et al. |
| 2006/0054708 | A1 | 3/2006 | Koo et al. |
| 2006/0132317 | A1 | 6/2006 | Letkomiller et al. |
| 2006/0176152 | A1 | 8/2006 | Wagner et al. |
| 2006/0187050 | A1 | 8/2006 | Wagner |
| 2006/0208859 | A1 | 9/2006 | Hougen et al. |
| 2006/0208890 | A1 | 9/2006 | Ehrman et al. |
| 2006/0208893 | A1 | 9/2006 | Anson et al. |
| 2006/0214773 | A1 | 9/2006 | Wagner et al. |
| 2007/0063817 | A1 | 3/2007 | Cherry |
| 2007/0095911 | A1 | 5/2007 | Shimura et al. |
| 2008/0215461 | A1* | 9/2008 | Bodin et al. ................. 705/28 |
| 2008/0272888 | A1* | 11/2008 | Cardwell et al. ........... 340/10.1 |

OTHER PUBLICATIONS

International Search Report dated Mar. 11, 2008 in International Application No. PCT/US07/79752.

Office action dated Dec. 20, 2007 for U.S. Appl. No. 11/084,072, filed Mar. 16, 2005, of Robert W. Hougen et al. (application published as US2006/0208859).

Response to Office action dated Apr. 14, 2008 for U.S. Appl. No. 11/084,072, filed Mar. 16, 2005, of Robert W. Hougen et al. (application published as US2006/0208859).

Office action dated Jul. 18, 2008 for U.S. Appl. No. 11/084,072, filed Mar. 16, 2005, of Robert W. Hougen et al. (application published as US2006/0208859).

Response to Office action dated Oct. 20, 2008 for U.S. Appl. No. 11/084,072, filed Mar. 16, 2005, of Robert W. Hougen et al. (application published as US2006/0208859).

Office action dated Jan. 22, 2009 for U.S. Appl. No. 11/084,072, filed Mar. 16, 2005, of Robert W. Hougen et al. (application published as US2006/0208859).

International Search Report and Written Opinion dated Mar. 12, 2007 for International Application No. PCT/US06/09558.

Extended European Search Report dated Jan. 29, 2008 for European Application No. EP 06738597 (regional phase application for International Application No. PCT/US06/09558).

Extended European Search Report dated Apr. 18, 2008 for European Application No. EP 06738597 (regional phase application for International Application No. PCT/US06/09558).

Office action dated Jul. 1, 2008 for European Application No. EP 06738597 (regional phase application for International Application No. PCT/US06/09558).

Response to Office action dated Nov. 3, 2008 for European Application No. EP 06738597 (regional phase application for International Application No. PCT/US06/09558).

Office action dated Jul. 10, 2008 for U.S. Appl. No. 11/364,851, filed Feb. 27, 2006, of Gary Steven Anson (application published as US2006/0208893).

Response to Office action dated Oct. 14, 2008 for U.S. Appl. No. 11/364,851, filed Feb. 27, 2006, of Gary Steven Anson (application published as US2006/0208893).

Notice of non-compliant amendment dated Jan. 23, 2009 for U.S. Appl. No. 11/364,851, filed Feb. 27, 2006, of Gary Steven Anson (application published as US2006/0208893).

Response to notice of non-compliant amendment dated Jan. 29, 2009 for U.S. Appl. No. 11/364,851, filed Feb. 27, 2006, of Gary Steven Anson (application published as US2006/0208893).

Office action dated Jul. 24, 2007 for U.S. Appl. No. 11/230,365, filed Sep. 19, 2005, of Craig D. Cherry (application patented as U.S. Patent No. 7,394,358).

Response to Office action dated Nov. 26, 2007 for U.S. Appl. No. 11/230,365, filed Sep. 19, 2005, of Craig D. Cherry (application patented as U.S. Patent No. 7,394,358).

Notice of Allowance dated Mar. 4, 2008 for U.S. Appl. No. 11/230,365, filed Sep. 19, 2005, of Craig D. Cherry (application patented as U.S. Patent No. 7,394,358).

Notice of Allowance dated Apr. 22, 2008 for U.S. Appl. No. 11/230,365, filed Sep. 19, 2005, of Craig D. Cherry (application patented as U.S. Patent No. 7,394,358).

Office action dated Feb. 7, 2008 for U.S. Appl. No. 11/356,887, filed Feb. 17, 2006 of James D. Wagner et al. (application published as US2007/0194929).

Response to final Office action dated Apr. 13, 2009 for U.S. Appl. No. 11/084,072, filed Mar. 16, 2005, of Robert W. Hougen et al (application published as US2006/0208859).

Notice of Allowance dated Apr. 30, 2009 for U.S. Appl. No. 11/084,072, filed Mar. 16, 2005, of Robert W. Hougen et al (application published as US2006/0208859).

Office action dated Apr. 30, 2009 for U.S. Appl. No. 11/364,851, filed Feb. 27, 2006, of Gary Steven Anson et al (application published as US2006/0208893).

Falcon®5500 RFID Mobile Hybrid Computer user manual (Addendum) R44-2494 (Rev. X3) PSC Inc. (no date).

Falcon®5500 RFID Mobile Hybrid Computer user manual (Addendum) R44-2494 (Rev. X4) PSC Inc. (no date).

Falcon®5500 RFID Mobile Hybrid Computer user manual (Addendum) R44-2494 (Rev. A) PSC Inc. (about Aug. 2006).

Office Action dated Jul. 24, 2007 for U.S. Appl. No. 11/230,365, filed Sep. 19, 2005 of Craig D. Cherry (application published as US2007/0063817).

Avery Weigh-Tronix, "Forklift Truck Scale," http://www.wtxweb.com/scales/Fklift%20Truck%20US.pdf , visited Feb. 13, 2006.

Weigh-Tronix, "QTLTSC With Simulcast,™" http://www.wtxweb.com/scales/HSC_SC_L.pdf, visited Feb. 13, 2006.

International Search Report dated Aug. 2, 2006 in International Application No. PCT/US06/04735, 8 pps.

*RFID Journal* "A Summary of RFID Standards" http://www.rfidjournal.com/article/articleprint/1335/-1/129/ (2002-2006) visited May 17, 2006.

Anthony Furness, "Present and Future Smart Active Label (SAL) Enabling Technologies", Centre for Automatic Identification and Intelligent Systems Technology Innovation Centre (2002).

Bert Moore, Editor of AIM Global, "Will There Ever be a 'Universal' RFID Readers?" http://www.aimglobal.org/org/members/news/templates/rfidinsights.asp?articleid=1-15&zoneid=24 , (visited Apr. 5, 2006).

* cited by examiner

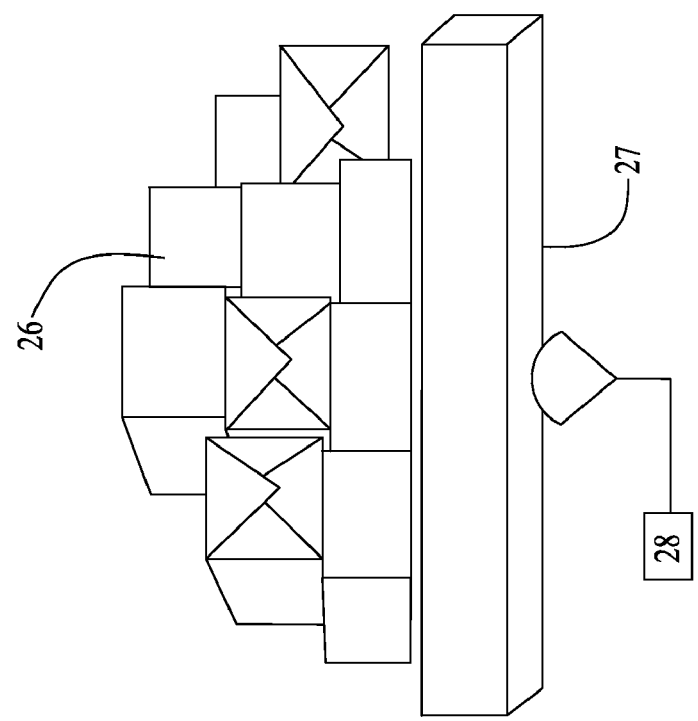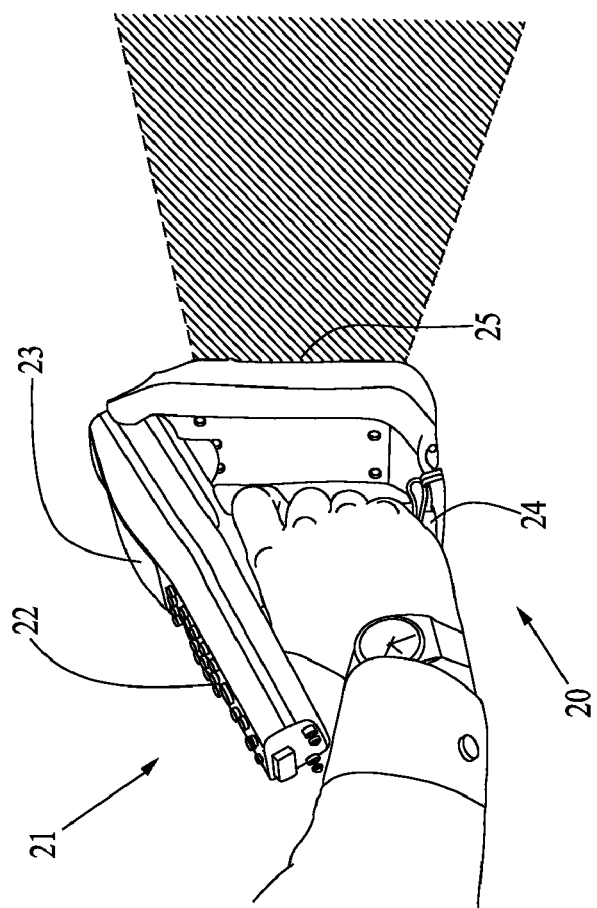
Fig. 2

SYSTEM AND METHOD FOR VERIFYING NUMBER OF WIRELESS TAGGED ITEMS IN A TRANSACTION

RELATED APPLICATION DATA

This application claims priority to provisional application No. 60/848,143 filed Sep. 29, 2006 hereby incorporated by reference.

BACKGROUND

The field of the present disclosure relates to operating methods and techniques for systems employing electronic tags such as radio frequency identification (RFID) tags. In particular, methods and apparatus are described herein for improving and facilitating operation of electronic tag and RFID reading systems.

RFID technology uses electromagnetic energy as a medium through which to send information. Typically, RFID tags are affixed to various articles for allowing identification of items in a sales transaction or tracking movement of the articles through a business location. In a typical RFID tag system, a receiver and some type of transmitter, an antenna, and memory are implemented. Through the use of these components, RFID tags are enabled to receive, store, and transmit article-identifying data to/from a remote data base station without the manual handling operations as is required in most bar code systems.

RFID tags may be read-only or read-write. Passive RFID tags may be implemented without an internal power source and draw their power from the radio frequency (RF) energy transmitted from the reader. Active RFID tags may include a power source such as a battery. RFID tags may be low or high frequency depending on the applications.

Existing RFID systems do not provide feedback to the user of an RFID reader to indicate whether or not the reader has effectively read each of the items. The present inventors have recognized that it may be advantageous for a user to receive feedback/verification that all items in the read zone have been effectively read by the RFID reader.

SUMMARY

Various embodiments described herein are directed to operation and feedback of systems combining an electronic tag reader (e.g., a Radio Frequency Identification "RFID" reader) with a weigh scale and/or an optical reader to verify reading operations for the electronic tag reader. In one embodiment, an RFID reader is combined with a weigh scale whereby input from the weigh scale is used to verify item identification by measuring a total weight of all the items (i.e. one or more items) on the weigh scale. The RFID reader obtains information from tags on each of the items in the read zone. The system then obtains item weight either via (1) using the item identification from the RFID tag and obtaining weight from a lookup table such as through the POS, or (2) extracting weight data stored in the RFID tag data itself. A total "calculated" weight is determined by adding the weights of all the items read by the RFID reader. The calculated weight is then compared to a "measured" weight of the items as measured by the weigh scale. If there is a discrepancy between the weights, then the operator may be notified to take further action. In another verification method, verification is provided by an imaging system that uses image recognition and/or optical code scanning to identify number of items. Upon completion of the RFID read operation, the number of items read by the RFID reader is compared to the number of items counted by the imaging system. If there is a discrepancy between the weights, then the operator may be notified to take further action.

Additional aspects and advantages will be apparent from the following detailed description of preferred embodiments, which proceeds with reference to the accompanying drawings.

BRIEF DESCRIPTION OF THE DRAWINGS

FIG. 2 is a diagram of an electronic tag reading system according to a second embodiment employing a handheld reader.

DETAILED DESCRIPTION OF PREFERRED EMBODIMENTS

Preferred embodiments will now be described with reference to the drawings. For the purposes of the present disclosure, certain of the descriptions will be described with respect to an RFID reader reading RFID tags, but the disclosure may also be applicable to other electronic tag types such as, for example, combined RFID/EAS tags, microwave tags, magnetic tags (e.g. acousto-magnetic), or other wireless electronic tag systems. The tag readers may comprise either electronic tag readers or combined electronic/RFID tag and optical code readers.

Figure 1:
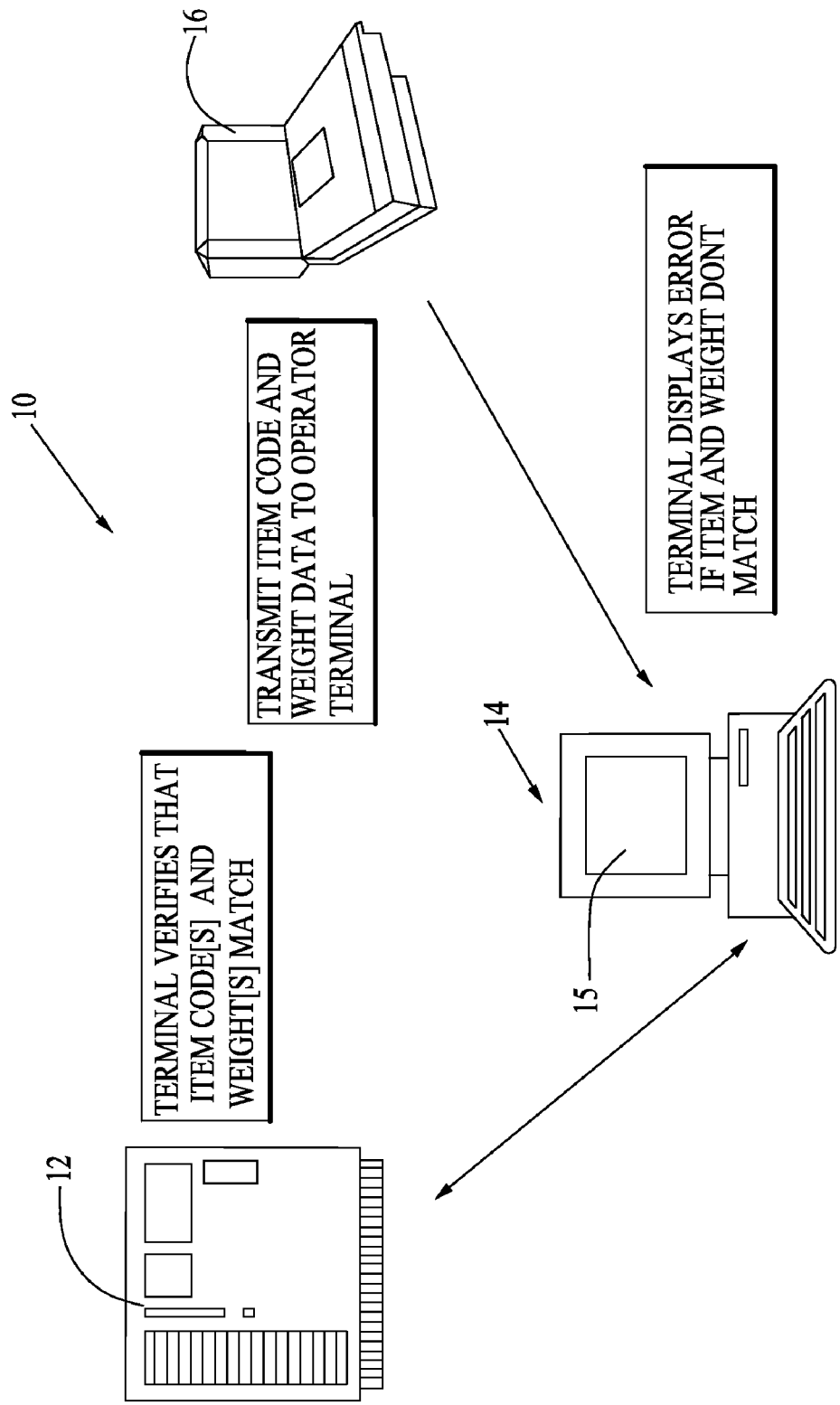
FIG. 1 is a diagram of an electronic tag reading system according to a first preferred embodiment for providing item read verification.

FIG. 1 illustrates a reading system 10 according to a first embodiment. Such a system may be applicable to various applications such as retail checkout, warehouse inventory, or parcel distribution. In the retail environment, the system 10 may be employed as a checker-assisted system or self-checkout such as at a grocery store or library.

The system 10 includes an RFID reader 16, the reader 16 preferably including an integrated scale. A plurality of items is placed on the scale in the read zone. Reading operation is commenced and the respective tag on each item is read by the reader. The reader 16 employs a suitable protocol, such as query response protocol or air interface protocol (AIP), to read each of the tags sequentially without the need for the user to manually pass each of the items one at a time through the read volume. Read operation may be initiated via several schemes, for example: (1) a manual input from the user, such as by pressing a "start scan" button on a control display screen 15 at the operator terminal 14; (2) an activation signal from the scale that items are present in the read zone; (3) an optical wakeup sensor indicating that items are present in the read zone. The RFID reader 16 obtains information from a tag on each item in the read zone and transmits the information to the operator terminal 14. At approximately the same time, the scale obtains a "measured" weight measuring a total weight of all the items (i.e. one or more items) on the weigh scale. The system, via a controller 12 (either at the terminal 14 or remotely) then obtains item weight either via (1) using the item identification from the RFID tag and obtaining weight from a lookup table such as through the POS, or (2) extracting weight data stored in the RFID tag data itself. A total "calculated" weight is determined by adding the weights of all the items read by the RFID reader. The calculated weight is then compared to the measured weight of the items as measured by the weigh scale. If there is a discrepancy between the weights, then the operator may be notified to take further action via a signal at the operator terminal. In the case of a retail self-checkout, both the customer-operator terminal and the store employee terminal may be provided with the further action notification.

FIG. 2 illustrates an alternate system 20 employing a handheld portable data terminal (PDT) 21. The PDT 21 includes a keypad 22, display (or touch) screen 23, handle section 24 and a reader section 25. The operator may manually sweep the reader 21 over a plurality of parcels 26 disposed on a scale 27. The reader 21 then attempts to read the RFID tag disposed on each item. Meanwhile the scale 27 measures a total weight of all the parcels 26 (the measured weight) and sends this weight information to the controller 28. Similarly to the previous embodiment, the system then compares the calculated weight of the items read by the reader to the measured weight of the items as measured by the weigh scale. If there is a discrepancy between the weights, then the operator may be notified to take further action via a suitable signal such as an audio signal from the PDT 21 or a visual signal on the display screen 23 of the PDT 21. Read operation may be activated in response to a trigger pull on the handheld PDT or via another suitable protocol/mechanism.

Figure 3:
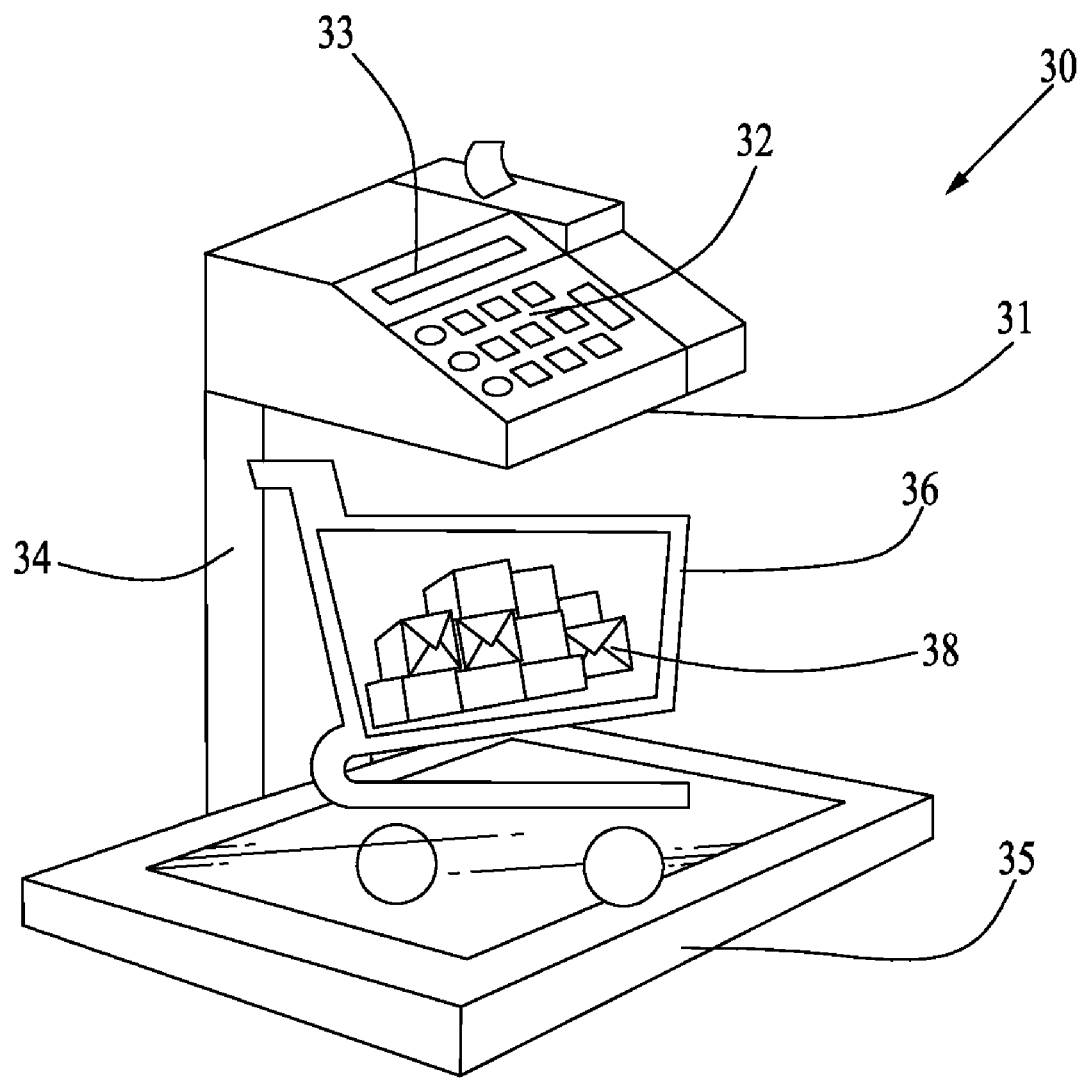
FIG. 3 is a diagram of an electronic tag reading system according to a third embodiment employing an alternate reader configuration.

In another configuration, particularly suited to the retail environment such as a grocery store, the user/operator or customer gathers items in a collection unit, such as a shopping cart, portable basket or bag, and proceeds to checkout. FIG. 3 is a diagram of an alternate checkout system 30. The shopping cart 36 (or shopping basket) containing a plurality of items/parcels 38 is placed onto a scale 35. The system 30 includes a reader 31 in this embodiment supported on a stand 34, located proximate the scale 35. The reader 31 includes a keypad 32 and display screen 33 for interacting with the user. The RFID reader 31 is preferably disposed so as to face the parcels 38 in the cart 36 from a desired direction. In the configuration in FIG. 3, the reader 31 faces in a downwardly direction to provide a direct line of site onto the parcels 38 without having to pass through the side of the cart as would be required if the reader were mounted in a sidewardly-facing direction.

The scale 35 measures a combined weight of the parcels 38 and cart 36. The weight of the cart 36 is subtracted from the combined weight to obtain the measured weight of the parcels 38. The weight of the cart 36 may be obtained by the system in several fashions. If all the carts are the same type and have the same weight, a standard weight may be used. If the customer may use a basket or a cart, or if there are several models of carts, each cart may be provided with an RFID tag itself and the reader 31 would read the tag on the cart while reading the tags on the parcels and obtain the cart weight from the tag or from a lookup table. The cart may be identified by an optical recognition device, or the user may input the information that a cart is on the scale via a user interface 32/33. Read verification of the parcels may then proceed as in the previous embodiments.

Figure 4:
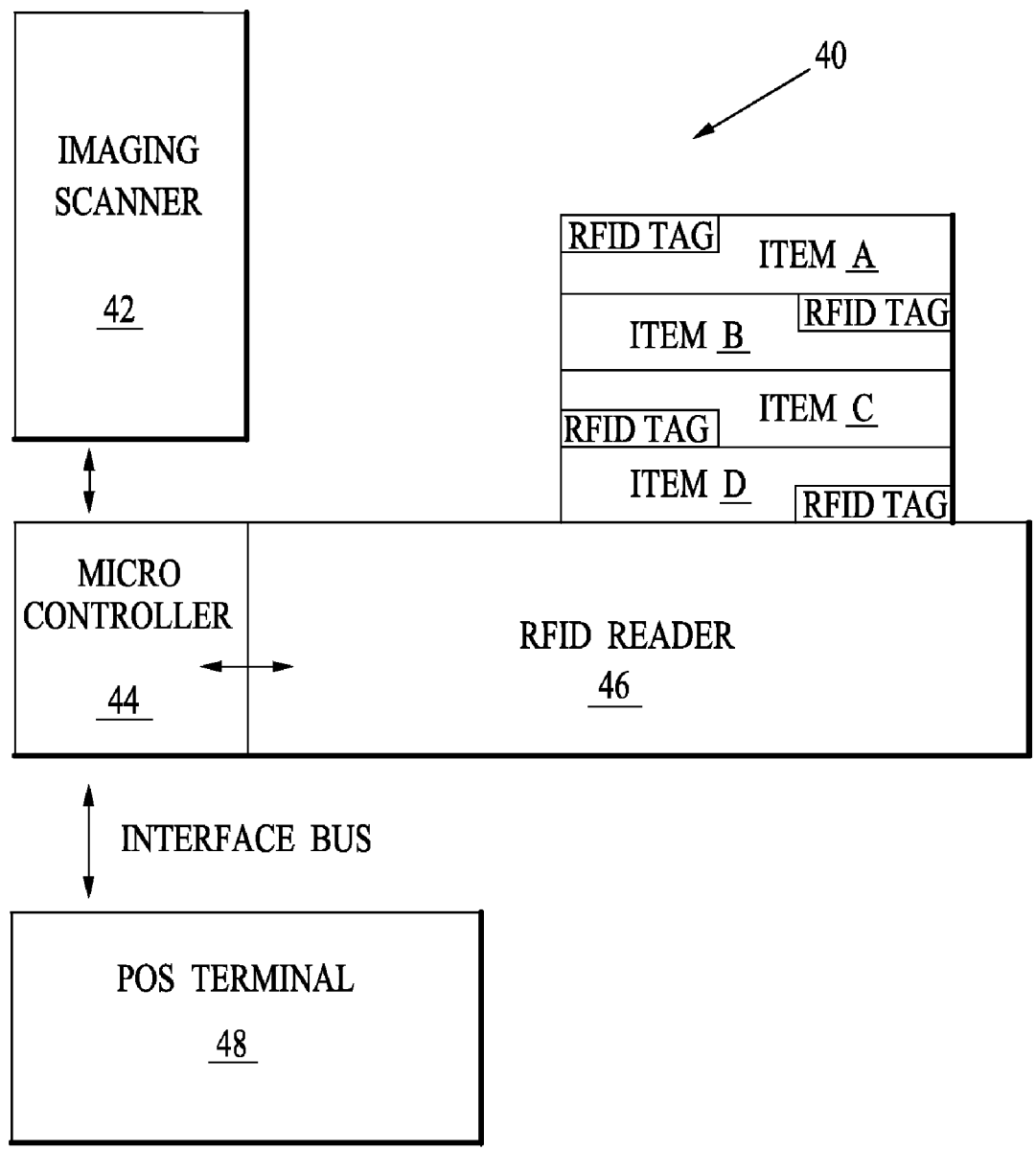
FIG. 4 is a diagram of an electronic tag reading system according to a fourth embodiment employing a imaging scanner for item read verification.

FIG. 4 illustrates another embodiment of a system 40 including an RFID reader 46 for reading a plurality of items (four items A-D) in a read zone. As in the previous embodiments, the system 40 includes a non-RF verification, i.e. a verification that is separate or independent from the RFID reader 31. The previous embodiments used a scale for verification, and the system 40 employs an imaging scanner 42 to provide a secondary item count or verification as a double-check to verify that the RFID reader has successfully read each of the RFID-tagged items in the read zone. The scanner 42 may employ image recognition software to identify specific items or merely provide an item count. In order to improve the scanner's ability to provide an accurate item count, the system 40 may be placed into an "image and learn" mode whereby an operator may train the system to recognize a single item out of a plurality of items in the read zone. Alternately, the system may also learn and/or cross-verify by comparing items read by the RFID reader 46 with items identified by the scanner 42.

It should be appreciated that the scale or other separate non-RF detection apparatus may be incorporated with the RFID reader into a common housing or otherwise integrated together. Even if the non-RF detection apparatus and the RFID reader are integrated, the mechanism/method by which non-RF detection is effected is still separate/independent. The non-RF detection of the number of items allows for separate or independent verification of the number of items such that the number of items detected by the non-RF apparatus or method may be compared to the number of items identified/read by the RFID reader.

In the following example, it is assumed that the RFID reader detects and reads only three out of four items in the read zone, and the system then operates according to the following steps.

The RFID reader 46 sending data (of the three tags successfully read) to the micro controller 44.

The micro-controller 44 sending a command to the scanner 42 to obtain an image of the items in the read zone.

The scanner 42 taking an image of the items in the read zone.

The scanner 42 sending the image to the micro-controller 44.

Software in the micro-controller "finding" items and identifying number and (optionally) type of items.

Comparing the number and type of items imaged to the RFID data for correlation.

If the RFID data correlates to the number of items (and type), sending the RFID data to the POS terminal 48.

If the items do not correlate, the micro-controller 44 not sending the RFID data to the POS terminal 48, and the micro-controller 44 sending a message to the POS terminal 48 to command the operator/cashier to manually pass each item through the read zone.

Alternately, in the event the items do not correlate, the micro-controller 44 may notify the operator to optically scan the items manually by presenting each item to the imaging scanner 42 to scan the bar code. In operation, the operator may not need to present each item. For example, after removing Item A and optically reading it with the scanner 42, the system 40 could then be reactivated with the RFID reader 46 attempting to read all the remaining items in the read zone. Repeating the process, the reader 46 may attempt to read all the remaining three items and the imaging scanner attempt to detect the number of items. If the read and the scan correlate this time for the three items, the RFID data is sent to the POS terminal.

Similar alternate methodology may be implemented in any of the above embodiments. For example, if any of the systems of FIGS. 1-4 fails to correlate, the operator may remove one or more items (the "removed items") from the read zone and reinstitute read operation. If the items remaining in the read zone are successfully read by the RFID reader and correlated to the non-RF verification, those items may be deemed successfully read and then moved out of the read zone to a successful read area. The "removed items" are then returned to the read zone and are re-read by the RFID reader. Alternately, the RFID reader may also comprise an optical reader. For example the RFID reader 16 in FIG. 1 may also include and optical laser scanner. The handheld reader 21 of FIG. 2 may include both RFID reading capability and barcode reading capability such as the FALCON® 5500 Series RFID Mobile Computer available from PSC Inc., now known as Datalogic Mobile, Inc., of Eugene, Oreg. The system 30 of FIG. 3 may include an optical reader downfacing from the reader 31. Alternately, the system may be provided with a separate handheld optical reader, for example kept in a holster mounted to the side of the reader 31, for reading the optical code on an item in the exceptions case.

Read operation by the RFID reader of any of the embodiments may be implemented via a suitable system that enables multiple tags to be read in a single operation. Various operation schemes are disclosed in U.S. patent application Ser. No. 11/230,365, Publication US2007/0063871, filed Sep. 19, 2005 or U.S. patent application Ser. No. 11/351,405, Publication US2006/0214773, filed Feb. 11, 2006, each application being hereby incorporated by reference.

Thus the present invention has been set forth in the form of its preferred embodiments. It is nevertheless intended that modifications to the disclosed methods and systems may be made by those skilled in the art without altering the inventive concepts set forth herein.

The invention claimed is:

1. A method of electronic tag reading, the method comprising:
    activating an electronic tag reader to read an electronic tag on each of a plurality of items located in a read zone;
    detecting, separately from operation of the electronic tag reader, the items in the read zone; and
    verifying that the electronic tag reader has read all the items in the read zone by comparing the items separately detected in the read zone to the items read by the electronic tag reader, wherein the steps of detecting and verifying comprise:
        determining the number of items read by the electronic tag reader;
        detecting, separately from operation of the electronic tag reader, the number of items in the read zone; and
        comparing the number of items separately detected in the read zone to the number of items determined to have been read by the electronic tag reader to verify that the electronic tag reader has read all the items in the read zone.

2. A method according to claim 1 wherein the step of detecting the number of items in the read zone further comprises
    scanning the read zone with an imaging system to detect the number of items in the read zone.

3. A method according to claim 1 wherein the step of detecting the items in the read zone further comprises
    weighing the items on a scale to obtain a total measured weight of all the items.

4. A method according to claim 1 further comprising notifying an operator that all the items have not been read if in the step of verifying it is determined that the electronic tag reader has not read all the items in the read zone.

5. A method according to claim 1 further comprising notifying an operator whether the electronic tag reader has read all the items that have been detected.

6. A method according to claim 5 wherein the step of notifying the operator comprises providing an audio signal.

7. A system for reading electronic tags on items located in a read zone, the system comprising:
    an electronic tag reader adapted to read the electronic tag on each of the items;
    a detection apparatus, separately operative from the electronic tag reader, that detects the items in the read zone;
    means for verifying that the electronic tag reader has read all the items in the read zone by comparing the items separately detected in the read zone to the items read by the electronic tag reader, wherein the electronic tag reader is adapted to determine the number of items read by the electronic tag reader and the detection apparatus is adapted to detect the number of items in the read zone, the means adapted to compare the number of items read by the electronic tag reader to the number of items detected by the detection apparatus to thereby verify that the electronic tag reader has read all the items in the read zone.

8. A method according to claim 2 wherein the step of detecting the number of items in the read zone further comprises:
    capturing an image of the items in the read zone with the imaging system; and
    finding the items in the image to detect the number of items in the read zone.

9. A method according to claim 8 wherein the step of detecting the items in the read zone further comprises classifying each of the items in the read zone into one of multiple types of items.

10. A system according to claim 7 wherein the detection apparatus includes an imaging system adapted to scan the read zone and a micro-controller communicating with the imaging system and adapted to recognize items scanned by the imaging system.

11. A system according to claim 10 wherein the micro-controller is adapted to recognize a single item out of a plurality of items scanned by the imaging system.

12. A method of electronic tag reading, the method comprising:
    reading a plurality of RFID tags each corresponding to one of a plurality of items located in a read zone of an RFID reader;
    determining the number of RFID tags read by the RFID reader;
    detecting, separately from operation of the RFID reader, the number of items in the read zone; and
    verifying that the RFID reader has read the RFID tags of all the items located in the read zone by comparing the number of RFID tags read by the RFID reader to the number of items detected in the read zone.

13. A method for retail checkout, the method comprising:
    positioning a plurality of items within a read zone of an electronic tag reader located at a checkout station, each of the items bearing an electronic tag;
    reading the electronic tags of the items to determine the number of electronic tags read by the electronic tag reader;
    positioning the items in proximity to an imaging system located at the checkout station;
    capturing an image of the items with the imaging system, the imaging system detecting the number of items in the image; and
    verifying that the electronic tag reader has read all the items by comparing the number of electronic tags read by the electronic tag reader to the number of items detected by the imaging system.

* * * * *